(12) United States Patent
Mital et al.

(10) Patent No.: US 10,047,651 B2
(45) Date of Patent: Aug. 14, 2018

(54) SOOT OXIDATION CATALYST MATERIALS AND SELECTIVE CATALYTIC REDUCTION FILTER DEVICES INCORPORATING THE SAME

(71) Applicant: GM GLOBAL TECHNOLOGY OPERATIONS LLC, Detroit, MI (US)

(72) Inventors: Rahul Mital, Rochester Hills, MI (US); David Brown, Commerce Township, MI (US); Wei Li, Troy, MI (US); Jianwen Li, Farmington Hills, MI (US)

( * ) Notice: Subject to any disclaimer, the term of this patent is extended or adjusted under 35 U.S.C. 154(b) by 0 days.

(21) Appl. No.: 15/370,451

(22) Filed: Dec. 6, 2016

(65) Prior Publication Data
US 2018/0156089 A1 Jun. 7, 2018

(51) Int. Cl.
| | |
|---|---|
| *F01N 3/10* | (2006.01) |
| *F01N 3/035* | (2006.01) |
| *B01D 46/00* | (2006.01) |
| *B01D 53/94* | (2006.01) |
| *B01J 21/06* | (2006.01) |
| *B01J 23/10* | (2006.01) |
| *B01J 23/30* | (2006.01) |
| *B01J 23/745* | (2006.01) |
| *B01J 35/00* | (2006.01) |

(Continued)

(52) U.S. Cl.
CPC .......... *F01N 3/035* (2013.01); *B01D 46/0002* (2013.01); *B01D 46/0027* (2013.01); *B01D 46/0061* (2013.01); *B01D 53/9431* (2013.01); *B01J 21/063* (2013.01); *B01J 23/10* (2013.01); *B01J 23/30* (2013.01); *B01J 23/745* (2013.01); *B01J 35/0006* (2013.01); *B01J 35/04* (2013.01); *F01N 3/023* (2013.01); *B01D 2279/30* (2013.01); *F01N 2510/065* (2013.01)

(58) Field of Classification Search
CPC ..... F01N 3/2066; F01N 3/035; B01D 43/565; B01D 53/944; B01D 53/9472
USPC .................. 422/171, 177, 180; 502/303–306
See application file for complete search history.

(56) References Cited

U.S. PATENT DOCUMENTS

| | | | |
|---|---|---|---|
| 7,014,825 B2 * | 3/2006 | Golden | ................ B01D 53/944 423/213.2 |
| 2004/0175315 A1 * | 9/2004 | Brisley | .............. B01D 53/9431 423/239.1 |

(Continued)

FOREIGN PATENT DOCUMENTS

KR 20080087981 A * 10/2008

*Primary Examiner* — Tom P Duong

(57) ABSTRACT

Selective catalytic reduction filter (SCRF) devices and systems incorporating the same are provided. Systems can include an exhaust gas source, an exhaust gas conduit capable of receiving an exhaust gas stream from the exhaust gas source, and an SCRF device in fluid communication therewith. The SCRF device can include a filter, a selective catalytic reduction (SCR) catalyst disposed on at least portion of the filter, and a soot oxidizing catalyst (SOC) material disposed on at least a portion of one or more of the filter and the SCR catalyst. The SOC material can include one or more transition metal oxides, excluding platinum group metals. The SOC material can include one or more of a titanium oxide, an iron oxide, a tungsten oxide, a cerium oxide, and acidic zirconia. The SOC material can be in amorphous form. The SOC material can be biased towards to the upstream side of the filter.

17 Claims, 2 Drawing Sheets

(51) Int. Cl.
*B01J 35/04* (2006.01)
*F01N 3/023* (2006.01)

(56) References Cited

U.S. PATENT DOCUMENTS

2014/0093442 A1* 4/2014 Spreitzer .............. B01D 53/944
423/239.1
2015/0352492 A1* 12/2015 Andersen ........... B01D 53/8634
423/237

* cited by examiner

SOOT OXIDATION CATALYST MATERIALS AND SELECTIVE CATALYTIC REDUCTION FILTER DEVICES INCORPORATING THE SAME

INTRODUCTION

During a combustion cycle of an internal combustion engine (ICE), air/fuel mixtures are provided to cylinders of the ICE. The air/fuel mixtures are compressed and/or ignited and combusted to provide output torque. After combustion, pistons of the ICE force exhaust gases in the cylinders out through exhaust valve openings and into an exhaust system. The exhaust gas emitted from an ICE, particularly a diesel engine, is a heterogeneous mixture that contains gaseous emissions such as carbon monoxide (CO), unburned hydrocarbons, oxides of nitrogen ($NO_x$), and oxides of sulfur (SOx), as well as condensed phase materials (liquids and solids) that constitute particulate matter. Liquids can include water and hydrocarbons, for example.

Exhaust gas treatment systems may employ catalysts in one or more components configured for accomplishing an after-treatment process such as reducing $NO_x$ to produce more tolerable exhaust constituents of nitrogen ($N_2$) and water ($H_2O$). One type of exhaust treatment technology for reducing $NO_x$ emissions is a selective catalytic reduction (SCR) device, which generally includes a substrate or support with a catalyst compound disposed thereon. Passing exhaust over the catalyst converts certain or all exhaust constituents in desired compounds, such as non-regulated exhaust gas components. A reductant is typically sprayed into hot exhaust gases upstream of the SCR, decomposed into ammonia, and absorbed by the SCR device. The ammonia then reduces the $NO_x$ to nitrogen and water in the presence of the SCR catalyst.

A particulate filter (PF) located upstream and/or downstream from the SCR can be utilized to capture soot. Water vapor, nitrogen and reduced emissions thereafter exit the exhaust system. A PF and SCR can be integrated as a selective catalytic reduction filter (SCRF). Over time, filter devices accumulate particulate matter and must be periodically regenerated. Filter regeneration often includes high temperature soot burning, which can be accomplished by a number of methods. However, all such methods impart substantial thermal energy to the exhaust gas system, and surrounding components, and can diminish exhaust gas treatment system efficacy and ICE efficiency.

SUMMARY

According to an aspect of an exemplary embodiment, a selective catalytic reduction filter (SCRF) device is provided. The SCRF device can include a shell, a filter disposed within the shell having an upstream side and a downstream side, a selective catalytic reduction (SCR) catalyst disposed within the shell on at least portion of the filter, and a soot oxidizing catalyst (SOC) material disposed on at least a portion of one or more of the filter and the SCR catalyst. The SOC material can include one or more transition metal oxides. The transition metal oxides can exclude platinum group metals. The SOC material can include one or more of a titanium oxide, an iron oxide, a tungsten oxide, a cerium oxide, and acidic zirconia. The SOC material can be in amorphous form. The SOC material can be biased towards to the upstream side of the filter. The SCRF device can comprise up to about 12 grams of SOC material per liter of volume as defined by the shell. The SCRF device can comprise at least about 0.25 grams of SOC material per liter of volume as defined by the shell.

According to another aspect of an exemplary embodiment, an exhaust gas treatment system is provided wherein the system includes an exhaust gas source, an exhaust gas conduit capable of receiving an exhaust gas stream from the exhaust gas source, an oxidation catalyst device in fluid communication with the exhaust gas conduit, a SCRF device in fluid communication with the exhaust gas conduit and disposed downstream relative to the oxidation catalyst device, wherein the SCRF device comprises a shell, a filter disposed within the shell having an upstream side and a downstream side, a SCR catalyst disposed within the shell on at least portion of the filter, and a soot oxidizing catalyst SOC material disposed on at least a portion of one or more of the filter and the SCR catalyst. The SOC material can include one or more transition metal oxides. The transition metal oxides can exclude platinum group metals. The SOC material can include one or more of a titanium oxide, an iron oxide, a tungsten oxide, a cerium oxide, and acidic zirconia. The SOC material can be in amorphous form. The SOC material can be biased towards to the upstream side of the filter. The system can optionally further include an oxidation catalyst device in fluid communication with the exhaust gas conduit and disposed upstream from the SCRF device.

Although many of the embodiments herein are described in relation to SCRF devices incorporating SOC materials, particularly as applied in vehicular exhaust gas treatment systems, the embodiments herein are generally suitable for any application wherein increasing the efficiency of soot burning lends an advantage.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Generally, this disclosure soot oxidation catalyst (SOC) materials, and devices and systems incorporating the same, capable of increasing the efficiency and/or efficacy of active regeneration techniques, as will be described below. In particular, this disclosure pertains to selective catalytic reduction filter (SCRF) devices having enhanced active regeneration efficiency, efficacy, and/or capabilities, wherein the SCRF devices are configured to receive exhaust gas streams from an exhaust gas source. Exhaust gas streams are generated, in some embodiments, by internal combustion engines (ICE) which can, for example, power a vehicle. As used herein, "$NO_x$" refers to one or more nitrogen oxides. $NO_x$ species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. Exhaust gas particulate matter generally includes carbonaceous soot, and other solid and/or liquid carbon-containing species which are germane to exhaust gas or form within an exhaust gas treatment system.

Figure 1:
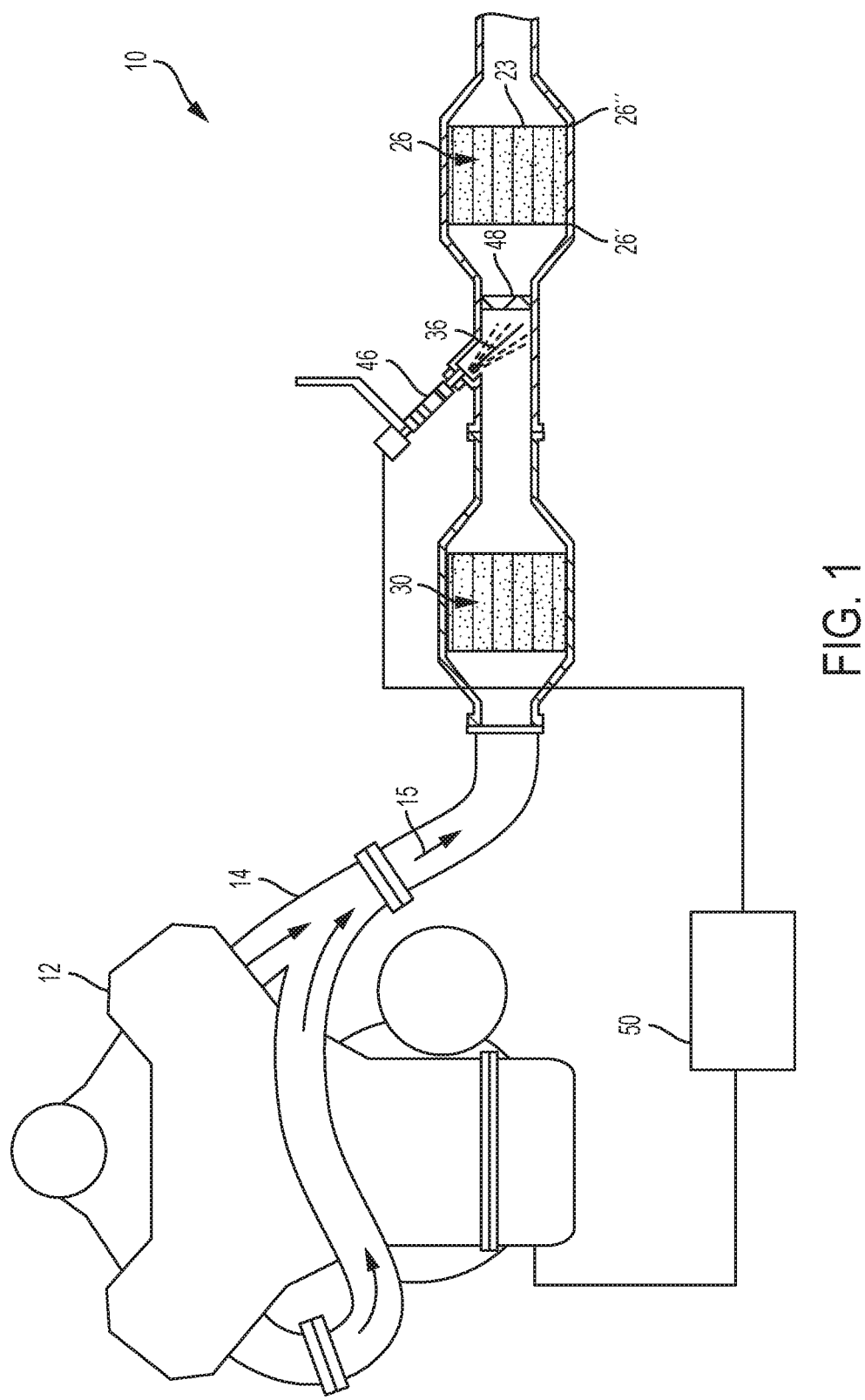
FIG. 1 illustrates an schematic view of an exhaust gas treatment system, according to one or more embodiments.

FIG. 1 illustrates an exhaust gas treatment system 10 for treating and/or monitoring the exhaust gas 15 constituents of an ICE 12. The exhaust gas treatment system 10 described herein can be implemented in various ICE systems that can include, but are not limited to, diesel engine systems, gasoline direct injection systems, and homogeneous charge compression ignition engine systems. The ICEs will be described herein for use in generating torque for vehicles, yet other non-vehicular applications are within the scope of this disclosure. Therefore when reference is made to a vehicle, such disclosure should be interpreted as applicable to any application of an ICE. Moreover, ICE 12 can generally represent any device capable of generating an exhaust gas stream 15 comprising gaseous (e.g., $NO_x$, $O_2$), carbonaceous, and/or particulate matter species, and the disclosure herein should accordingly be interpreted as applicable to all such devices. It should be further understood that the embodiments disclosed herein may be applicable to treatment of effluent streams not comprising carbonaceous and/or particulate matter species, and, in such instances, ICE 12 can also generally represent any device capable of generating an effluent stream comprising such species. For Example, ICE 12 can include a plurality of reciprocating pistons (not shown) attached to a crankshaft (not shown), which may be operably attached to a driveline, such as a vehicle driveline (not shown), to deliver tractive torque to the driveline. For example, ICE 12 can be any engine configuration or application, including various vehicular applications (e.g., automotive, marine and the like), as well as various non-vehicular applications (e.g., pumps, generators and the like).

The exhaust gas treatment system 10 generally includes one or more exhaust gas conduits 14, and one or more exhaust treatment devices. The exhaust gas conduit 14, which can comprise several segments, transports exhaust gas 15 from the ICE 12 to the various exhaust treatment devices of the exhaust gas treatment system 10. In some exemplary embodiments, exhaust gas 15 can comprise $NO_x$ species.

In the embodiment as illustrated, the exhaust gas treatment system 10 devices includes an optional oxidation catalyst (OC) device 30, and a selective catalytic reduction (SCR) device 26. The OC device 30 and a selective catalytic reduction (SCR) device 26 can be downstream from a turbocharger (not shown) in some embodiments. SCR devices can include SCRF devices, as will be described below. Upstream and downstream are defined in relation to the direction of the flow of exhaust gas 15 from ICE 12. As shown in FIG. 1, SCR device 26 includes an upstream side 26' and a downstream side 26".

As can be appreciated, the exhaust gas treatment system 10 of the present disclosure can include various combinations of one or more of the exhaust treatment devices shown in FIG. 1A, and/or other exhaust treatment devices (not shown), and is not limited to the present example. Exhaust gas treatment system 10 can further include a control module 50 operably connected via a number of sensors to monitor the engine 12 and/or the exhaust gas treatment system 10.

Control module 50 can be operably connected to the engine 12 and/or various exhaust gas treatment system 10 components. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. The control module 50 can be operably connected to the exhaust treatment devices described above, including OC device 30, SCRF device 26, and one or more gas sensors (not shown) and/or temperature sensors (not shown), for example.

The OC device 30 can be positioned upstream from the SCRF device 26, and can include a flow-through metal or ceramic monolith substrate packaged in shell or canister. The shell or canister includes an inlet and an outlet in fluid communication with exhaust gas conduit 14, and can ideally comprise a substantially inert material, relative to the exhaust gas constituents, such as stainless steel. The substrate can include an oxidation catalyst compound disposed thereon. The oxidation catalyst compound can be applied as a wash coat and can contain platinum group metals such as platinum (Pt), palladium (Pd), rhodium (Rh) or other metal oxide catalysts, and combinations thereof. Metal oxide catalyst can include iron oxides, zinc oxides, perovksites, and combination thereof, for example. The OC device 30 is useful in treating unburned gaseous and non-volatile unburned hydrocarbons and CO, which are oxidized to form carbon dioxide and water.

OC devices are generally positioned upstream from SCR and SCRF devices to serve several catalytic functions. When PF device and SCRF devices become clogged with particulate matter (e.g., soot) and require high temperature regeneration, the OC device is utilized for after-injection regeneration. After-injection regeneration strategies manipulate engine calibrations such that fuel after-injected into the engine cylinders is expelled into the exhaust system uncombusted. When the after-injected fuel contacts the OC device, such as OC device 30, heat released during oxidation of the fuel is imparted to the exhaust gas treatment system 10 to clear the SCRF device 26 of some or all accumulated particulate matter. Secondly, OC devices convert NO into $NO_2$, which is more efficiently and preferentially reduced into desired species by the downstream SCR device, such as SCRF device 26.

In general, the SCR device 26 includes all devices which utilize a reductant 36 and a catalyst to NO and $NO_2$ to harmless components. The SCR device 26 can include, for example, a flow-through ceramic or metal monolith substrate that can be packaged in a shell or canister having an inlet and an outlet in fluid communication with the exhaust gas conduit 14 and optionally other exhaust treatment devices. The shell or canister can ideally comprise a substantially inert material, relative to the exhaust gas constituents, such as stainless steel. The substrate can include a SCR catalyst composition applied thereto.

The substrate body can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The substrate body can be formed from a material capable of withstanding the temperatures and chemical environment associated with the exhaust gas 15. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The substrate can comprise a non-sulfating $TiO_2$ material, for example. The substrate body can be a PF device, as will be discussed below.

The SCR catalyst composition is generally a porous and high surface area material which can operate efficiently to convert $NO_x$ constituents in the exhaust gas 15 in the presence of a reductant 36, such as ammonia. For example, the catalyst composition can contain a zeolite impregnated with one or more base metal components such as iron (Fe), cobalt (Co), copper (Cu), vanadium (V), sodium (Na), barium (Ba), titanium (Ti), tungsten (W), and combinations thereof. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, described below, which are regenerated via high temperature exhaust soot burning techniques.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

The SCR device 26 generally uses a reductant 36 to reduce $NO_x$ species (e.g., NO and $NO_2$) to harmless components. Harmless components include one or more of species which are not $NO_x$ species, such as diatomic nitrogen, nitrogen-containing inert species, or species which are considered acceptable emissions, for example. The reductant 36 can be ammonia ($NH_3$), such as anhydrous ammonia or aqueous ammonia, or generated from a nitrogen and hydrogen rich substance such as urea ($CO(NH_2)_2$). Additionally or alternatively, the reductant 36 can be any compound capable of decomposing or reacting in the presence of exhaust gas 15 and/or heat to form ammonia. Equations (1)-(5) provide exemplary chemical reactions for $NO_x$ reduction involving ammonia.

$$6NO+4NH_3 \rightarrow 5N_2+6H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

$$2NO_2+4NH_3+O_2 \rightarrow 3N_2+6H_2O \tag{4}$$

$$NO+NO_2+2NH_3 \rightarrow 2N_2+3H_2O \tag{5}$$

It should be appreciated that Equations (1)-(5) are merely illustrative, and are not meant to confine the SCR device 26 to a particular $NO_x$ reduction mechanism or mechanisms, nor preclude the operation of other mechanisms. The SCR device 26 can be configured to perform any one of the above $NO_x$ reduction reactions, combinations of the above $NO_x$ reduction reactions, and other $NO_x$ reduction reactions.

The reductant 36 can be diluted with water in various implementations. In implementations where the reductant 36 is diluted with water, heat (e.g., from the exhaust) evaporates the water, and ammonia is supplied to the SCR device 26. Non-ammonia reductants can be used as a full or partial alternative to ammonia as desired. In implementations where the reductant 36 includes urea, the urea reacts with the exhaust to produce ammonia, and ammonia is supplied to the SCR device 26. The SCR device 26 can store (i.e., absorb, and/or adsorb) ammonia supplied by the reductant 36 for interaction with exhaust gas 15. Reaction (6) below provides an exemplary chemical reaction of ammonia production via urea decomposition.

$$CO(NH_2)_2+H_2O \rightarrow 2NH_3+CO_2 \tag{6}$$

It should be appreciated that Equation (6) is merely illustrative, and is not meant to confine the urea or other reductant 36 decomposition to a particular single mechanism, nor preclude the operation of other mechanisms.

A reductant 36 can be supplied from a reductant supply source (not shown) and injected into the exhaust gas conduit 14 at a location upstream of the SCR device 26 using an injector 46, or other suitable method of delivery of the reductant 36 to the exhaust gas 15. The reductant 36 can be in the form of a gas, a liquid, or an aqueous solution, such as an aqueous urea solution. The reductant 36 can be mixed with air in the injector 46 to aid in the dispersion of the injected spray. A mixer or turbulator 48 can also be disposed within the exhaust conduit 14 in close proximity to the injector 46 to further assist in thorough mixing of the reductant 36 with the exhaust gas 15 and/or even distribution throughout the SCR device 26.

Figure 2:
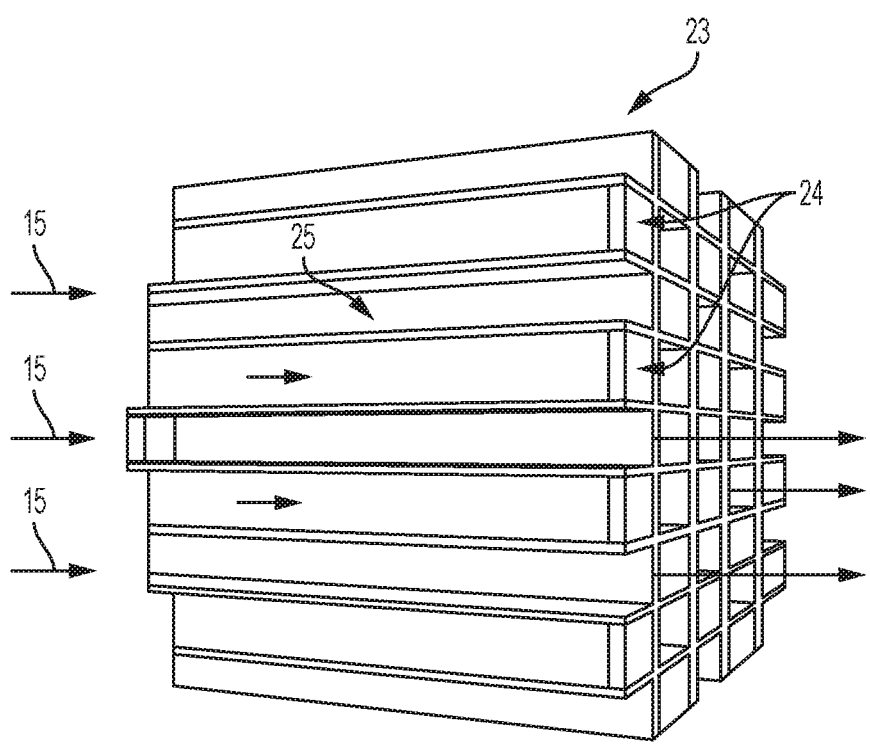
FIG. 2 illustrates a perspective view of a particulate filter, according to one or more embodiments.

One example of an exhaust gas treatment device is a PF device. A PF device can be disposed downstream of the OC device 30 and upstream of a SCR device 26, or can be disposed downstream of the SCR device 26. For example only, a PF device can include a diesel particulate filter (DPF). A PF device generally operates to filter the exhaust gas 15 of carbon, soot, and other particulates. A PF device can include a filter 23, as shown in FIG. 2. The filter 23 can be a ceramic or SiC wall flow monolith filter that can be packaged in a shell or canister having an inlet and an outlet in fluid communication with exhaust gas conduit 14. The shell or canister can ideally comprise a substantially inert material, relative to the exhaust gas constituents, such as stainless steel. It is appreciated that the ceramic or SiC wall flow monolith filter is merely exemplary in nature and that the PF device can include other filter devices such as wound or packed fiber filters, open cell foams, sintered metal fibers, etc. The filter 23 can have a plurality of longitudinally extending passages 24 and 25 that are defined by longitudinally extending walls. The passages include a subset of inlet passages 24 that have an open inlet end and a closed outlet end, and a subset of outlet passages 25 that have a closed inlet end and an open outlet end. Exhaust gas 15 entering the filter 23 through the inlet ends of the inlet passages 24 is forced to migrate through adjacent longitudinally extending walls to the outlet passages 25. It is through this wall flow mechanism that the exhaust gas 15 is filtered of carbon and other particulates.

One example of an exhaust gas treatment device is an SCRF device, which combines the features of SCR devices and PF devices into a single device. In FIG. 1, SCR device 26 is shown having a PF filter 23 and accordingly comprises an SCRF device 26. SCRF device 26 comprises PF filter 23 coated with an active catalytic component, such as the SCR catalytic components described above. The catalytic component can be applied as a washcoat to the inner walls of inlet passages 24 of the filter, outlet passages 25 of the filter, or both. Generally the washcoat can be applied in an amount of about 60 g to about 180 g of washcoat per liter of SCRF device 26 volume, although other amounts of practicable. In some embodiments, the washcoat can be applied in a thickness of about 15 µm to about 50 µm. During operation, SCRF device 26 accumulates particulate matter within the passage 24, and occasionally within passage 25, and reductant 36 becomes generally disposed on the catalytic component such as through adsorption and/or absorption, for interaction with exhaust gas 15. It should be understood that the description provided of SCRF device 26 is not meant to restrict the definition of a SCRF device, nor preclude the use of various additional or alternative SCRF designs in conjunction with the embodiments described herein.

Over time, filter devices, such as SCRF device 26, can accumulate particulate matter and must be regenerated. Accumulation of particular matter can degrade the efficiency of SCRF device 26 and increase back pressure on an ICE 12, for example. Regeneration generally involves the oxidation or burning of the accumulated particulate matter in SCRF device 26. For example, carbonaceous soot particulates can be oxidized during the regeneration process to produce gaseous carbon dioxide. In general, heating carbonaceous exhaust gas deposits to temperatures at least about 600° C. can initiate soot burning. Soot burning can convert carbonaceous solids to gases such as carbon dioxide, for example, or effect a chemical or physical change in the soot or accumulated deposits such that the deposits disengage from the SCRF device 26. For the purposes of this disclosure, active regeneration comprises raising the temperature of exhaust gas 15 to at least about 550° C.

In many instances, active regeneration comprises increasing exhaust gas 15 temperature or the temperature of appurtenant devices. Increasing exhaust gas 15 temperature can be achieved by a number of methods, such as adjusting engine calibration parameters to implement a post-injection strategy, adjusting engine calibration parameters to implement an after-injection strategy, utilizing an optional EHC device (not shown), and combinations thereof. The optional EHC device can be disposed within the OC device 30, for example, and include a monolith and an electrical heater. The electrical heater can be connected to an electrical source for providing power thereto, and can be selectively activated to heat the monolith. It should be evident to one of skill in the art that the active regeneration techniques described herein are non-limiting of active regeneration techniques, and those not described herein are presumed to be similarly suitable for use in combination with the materials and devices provided.

A post-injection strategy is a modification of a normal ICE injection strategy. During the operation of an ICE, such as ICE 12, one or more pistons of the ICE perform four strokes within the one or more corresponding cylinders: an intake stroke, a compression stroke, a combustion stroke, and an exhaust stroke. During the intake stroke, the piston begins at top dead center (TDC) and ends at bottom dead center (BDC). The cylinder intake valve achieves an open position to allow the piston to pull an air-fuel mixture into the cylinder by producing vacuum pressure into the cylinder through its downward motion. The compression stroke subsequently begins at BDC and ends at TDC. With the cylinder intake and exhaust valves are closed; the piston compresses the air-fuel mixture in preparation for ignition. During the subsequent combustion stroke, the piston is at TDC and the compressed air-fuel mixture is ignited by a spark plug (in a gasoline engine) or by the compression (diesel engines) achieved during the compression stroke. After ignition of the air-fuel mixture, the combustion forcefully returns the piston to BDC and translates mechanic work to an associated crankshaft. During the subsequent exhaust stroke, the piston returns from BDC to TDC with the exhaust valve in an open position in order to expel the spent air-fuel mixture into an exhaust gas system, such as exhaust gas treatment system 10.

A post-injection strategy comprises injecting fuel into an engine cylinder after the air-fuel mixture is introduced into the cylinder during the intake stroke. Post-injection occurs during the combustion stroke, before the exhaust valves open during the exhaust stroke, and after the first air-fuel mixture has already combusted, or is combusting. More specifically, post-injection occurs while the piston is sufficiently near to TDC such that the post-injected fuel can substantially or completely combust within the cylinder. By introducing additional fuel into the cylinder, post-injection accordingly raises the temperature of the exhaust gas expelled from the cylinder.

An after-injection strategy introduces fuel to the exhaust gas treatment system 10 such that the fuel combusts and/or reacts with a catalytic component of the system 10 and increases the temperature of the exhaust gas 15. Specifically, an after-injection strategy comprises injecting fuel into an engine cylinder after the air-fuel mixture is introduced into the cylinder during the intake stroke. After-injection occurs during the combustion stroke and/or exhaust stroke, while the exhaust valve is open or just before the exhaust valve opens. More specifically, after-injection occurs while the piston is sufficiently far from TDC and/or after the first air-fuel mixture has already combusted such that the after-injected fuel does not combust within the cylinder. The after-injected fuel is expelled unburnt from the cylinder during the exhaust stroke and introduced to the exhaust gas system. When the after-injected fuel contacts the OC device 30, heat released during oxidation of the fuel is imparted to the exhaust gas treatment system 10 to clear the SCRF device 26 of some or all accumulated particulate matter.

Active regeneration of filter devices such as SCRF device 26 can be damaging to system 10 devices and surrounding components due to the substantial thermal energy introduced by one or more of the active regeneration processes described. Further, active regeneration strategies can detrimentally impact vehicle fuel economy and/or ICE 12 performance. Accordingly, provided herein are SOC materials, and devices and systems incorporating the same, capable of increasing the efficiency and/or efficacy of active regeneration, thereby eliminating or reducing temperature, duration, and/or need for the implantation of active regeneration techniques. The SOC materials provided herein may also further provide passive soot oxidation capabilities (i.e., soot oxidation in temperatures below active regeneration temperature conditions.) The below concepts will described in relation to exhaust gas system 10 for the purpose of illustration only, and one of skill in the art will recognize such illustrations as being non-limiting.

In one embodiment, an SCRF device 26, having an upstream side 26' and a downstream side 26", includes a shell, such as those described above, a filter 23, such as those described above, disposed within the shell, and an SCR catalyst, such as those described above, disposed within the shell. The SCR catalyst can be coated or otherwise disposed on at least a portion of the filter 23 in some embodiments. The SCRF device 26 further comprises a SOC material coating disposed on at least a portion of the filter 23.

It has been determined that active regeneration efficiency is improved by the increased presence of in-situ $NO_2$ (i.e., $NO_2$ formed within the SCRF device 26), which aids in the removal of particulate matter. For example only, and with the appreciation that other additional or alternative mechanisms may exist, Equation (7) illustrates the role of $NO_2$ in converting carbonaceous deposits to gaseous species:

$$2NO_2 + C \rightarrow 2NO + CO_2 \qquad (7)$$

Accordingly, the SOC materials described herein are capable of generating in-situ $NO_2$. For example only, and with the appreciation that other additional or alternative mechanisms may exist, Equation (8) illustrates the formation of in-situ $NO_2$ as catalyzed by the SOC materials described herein:

$$NO + O_2 \rightarrow NO_2 \qquad (8)$$

SCRF devices described herein can include one or more SOC materials. The SOC material can comprise one or more transition metal oxides. Transition metals are those found in periodic groups IIIB, IVB, VB, VIB, VIIB, VIII, IB, and IIB. In some embodiments, transition metals include those found in periodic groups IIIB, IVB, VB, VIB, VIIB, VIII, IB, and IIB, excluding platinum group metals (PGM), i.e., excluding nickel, palladium, and platinum. Specific examples of transition metal oxides include titanium oxides, iron oxides, tungsten oxides, and cerium oxides. Iron oxides can include $Fe_2O_3$ and $Fe_3O_4$ in some embodiments. Tungsten oxides can include tungsten supported on zironian oxide (e.g., $WO_x$ supported on $ZrO_2$), or tungsten supported on titania (e.g., $WO_x$ supported on $TiO_2$), for example. In one embodiment, a SOC material comprises acidic zirconia, such as a hydrochloric acid impregnated zirconia (e.g., $ZrCl_x$ on $ZrO_2$). In one embodiment, a SOC material comprises a perovskite. A perovskite can be defined as $ABO_3$, wherein A can include La and Ca, and B can include Co, Mn, Fe, Cu, and Ti. In a specific embodiment the perovskite comprises $CaTiO_3$.

PGMs are not suitable SOC materials as they are strong oxidizers capable of converting reductant (e.g., ammonia) within the SCRF device 26 to $NO_x$ species. For example, Equation (9) provides an example mechanism by which ammonia is oxidized to NO over a platinum catalyst.

$$4NH_3 + 5O_2 \rightarrow 4NO + 6H_2O \qquad (9)$$

Accordingly, a suitable SOC material is one capable of generating in-situ $NO_2$ without oxidizing reductant, or one which confers a net in-situ $NO_2$ generating benefit relative to its reductant 36 oxidizing effect. A reductant 36 oxidizing effect can be counteracted by increasing reductant 36 delivery to the SCRF device 26. In one example, a SOC material exhibits a suitable net in-situ $NO_2$ generating benefit relative to its reductant oxidizing effect if the net in-situ $NO_2$ generation translates to a fuel saving of 1% (e.g., by extending the interval between regenerations) and up to about a 5% increase in reductant 36 delivery is required to counteract the reductant 36 oxidizing effect. In some embodiments, a SOC material exhibits a suitable net in-situ $NO_2$ generating benefit relative to its reductant oxidizing effect if the net in-situ $NO_2$ generation translates to a fuel saving of 1% and up to about a 3% to about a 5% increase in reductant 36 delivery is required to counteract the reductant 36 oxidizing effect.

As disposed on at least a portion of the filter 23, the one or more SOC materials can be in "amorphous" form, in that they are not impregnated in the unit cell and/or crystalline structure of a zeolite, metal organic framework, or like material. The SOC material coating can be applied in an amount of about 1 g/L to about 12 g/L, wherein g/L refers to grams of SOC material per liter of volume within the SCRF device 26. The volume of the SCRF device 26 can be defined by its canister or shell, for example. In one embodiment, the SOC material coating can be applied in an amount of up to about 8 g/L, up to about 10 g/L, up to about 12 g/L, or up to about 14 g/L. In one embodiment, the SOC coating can be applied in an amount of at least about 0.25 g/L, at least about 0.50 g/L, at least about 0.75 g/L, at least about 1.0 g/L, or at least about 1.25 g/L. In a specific embodiment, the SOC coating can be applied in an amount of about 1.0 g/L to about 12 g/L.

The SOC material can be disposed on at least a portion of the filter 23 and/or on at least a portion of The SOC material can be applied to the filter 23 after a SCR catalyst has been applied to at least a portion of the filter 23. In this embodiment, the SOC material can be applied on top of previously applied SCR catalyst, thereby forming a separate layer. In other embodiments the SOC material can be applied to the filter 23 in combination with a SCR catalyst, to form a combined layer. The SOC coating can be applied to the filter 23 as a washcoat, in some embodiments. The SOC coating can be applied as a slurry, wherein the slurry includes the SOC material and water. For example, the slurry can be about 30% to about 45% SOC material, by weight, with the balance comprising water. For example, the slurry can be about 25% to about 60% SOC material, by weight, with the balance comprising water. In another embodiment, the SOC material and SCR catalyst can be applied as a slurry comprising SOC material, SCR catalyst, and water.

The SOC coating can be biased towards to the upstream side 26' of the SCRF device 26". An upstream-biased coating can include a greater amount of SOC material on the filter 23 and/or SCR catalyst near the upstream side 26' relative to the downstream side 26". For example, up to about 10%, up to about 20%, up to about 30%, up to about 40%, or up to about 50% of the SCRF device 26 length, measured from the upstream side 26', can be coated with the SOC material. An upstream-biased coating can include a portion of the filter 23 and/or SCR catalyst proximate the downstream side 26" which includes no SOC material. An upstream-biased coating can include a SOC material thickness which decreases from the upstream side 26' to the downstream side 26" of the SCRF device 26. In embodiments where the SOC material is capable of oxidizing reductant 36 to NOR, particularly NO, an upstream-biased coating provides more opportunity for the in-situ NO to interact with the SCR catalyst before exiting the downstream side 26" of the SCRF device 26. In some embodiments, as second SCR device (not shown) can optionally be disposed downstream from the SCRF device 26 to ensure that any $NO_x$ slip is mitigated. NO slip includes the escape of NO species from the SCRF device 26. Such mitigation can include reduction or storage of the NO species by the second SCR device, for example.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A selective catalytic reduction filter (SCRF) device, the device comprising:
    a shell;
    a filter disposed within the shell having an upstream side and a downstream side;
    a selective catalytic reduction (SCR) catalyst disposed within the shell on at least portion of the filter and configured to receive reductant; and
    a soot oxidizing catalyst (SOC) material disposed on at least a portion of one or more of the filter and the SCR catalyst, wherein the SOC material comprises one or more of titanium oxide, acidic zirconia, or a perovskite and the SOC material confers a suitable net in-situ NO2 generating benefit relative to its reductant oxidizing effect.

2. The SCRF device of claim 1, wherein the transition metal oxide does not include platinum group metals.

3. The SCRF device of claim 1, wherein the SOC material further comprises one or more of tungsten supported on zirconium oxide, and tungsten supported on titanium oxide.

4. The SCRF device of claim 1, wherein the SOC material is in an amorphous form.

5. The SCRF device of claim 1, wherein the SCRF device comprises up to about 12 grams of SOC material per liter of volume as defined by the shell.

6. The SCRF device of claim 1, wherein the SCRF device comprises at least about 0.25 grams of SOC material per liter of volume as defined by the shell.

7. The SCRF device of claim 1, wherein the SOC material and SCR catalyst are applied to at least a portion of the filter as a single layer.

8. The SCRF device of claim 1, wherein the SOC material is biased towards to the upstream side of the filter.

9. The SCRF device of claim 1, wherein the SOC material is capable of generating in-situ NO2.

10. The SCRF device of claim 1, wherein the SOC material confers a suitable net in-situ NO2 generating benefit relative to its reductant oxidizing effect.

11. An exhaust gas treatment system, the system comprising:
    an exhaust gas source;
    an exhaust gas conduit capable of receiving an exhaust gas stream from the exhaust gas source; and
    a selective catalytic reduction filter (SCRF) device in fluid communication with the exhaust gas conduit and disposed downstream relative to the oxidation catalyst device, wherein the SCRF device includes:
    a shell,
    a filter disposed within the shell having an upstream side and a downstream side,
    a selective catalytic reduction (SCR) catalyst disposed within the shell on at least a portion of the filter and configured to receive reductant, and
    a soot oxidizing catalyst (SOC) material disposed on at least a portion of one or more of the filter and the SCR catalyst, wherein the SOC material comprises one or more of titanium oxide, acidic zirconia, or a perovskite and the SOC material confers a suitable net in-situ NO2 generating benefit relative to its reductant oxidizing effect.

12. The exhaust gas treatment system of claim 11, wherein the SOC further comprises material selected from the group consisting of transition metal oxides, excluding platinum group metals.

13. The exhaust gas treatment system of claim 11, wherein the SOC material confers a suitable net in-situ NO2 generating benefit relative to its reductant oxidizing effect.

14. The exhaust gas treatment system of claim 11, wherein the SOC material is in an amorphous form.

15. The exhaust gas treatment system of claim 11, further comprising an oxidation catalyst device in fluid communication with the exhaust gas conduit and disposed upstream from the SCRF device.

16. The exhaust gas treatment system of claim 11, wherein the SOC material is capable of generating in-situ NO2.

17. A selective catalytic reduction filter (SCRF) device, the device comprising:
    a shell;
    a filter disposed within the shell having an upstream side and a downstream side;
    a selective catalytic reduction (SCR) catalyst disposed within the shell on at least portion of the filter and configured to receive reductant; and
    a soot oxidizing catalyst (SOC) material disposed on at least a portion of one or more of the filter and the SCR catalyst, wherein the SOC material comprises one or more perovskites, and wherein the one or more perovskites are capable of generating in-situ NO2 and the SOC material confers a suitable net in-situ NO2 generating benefit relative to its reductant oxidizing effect.

* * * * *